United States Patent
Kakeya et al.

(10) Patent No.: US 10,693,127 B2
(45) Date of Patent: Jun. 23, 2020

(54) ALKALINE STORAGE BATTERY

(71) Applicants: GS Yuasa International Ltd., Kyoto-shi, Kyoto (JP); KYOTO UNIVERSITY, Kyoto (JP)

(72) Inventors: Tadashi Kakeya, Kyoto (JP); Akiyoshi Nakata, Kyoto (JP); Hajime Arai, Kyoto (JP); Zempachi Ogumi, Kyoto (JP)

(73) Assignees: GS Yuasa International Ltd., Kyoto (JP); KYOTO UNIVERSITY, Kyoto (JP)

( * ) Notice: Subject to any disclaimer, the term of this patent is extended or adjusted under 35 U.S.C. 154(b) by 68 days.

(21) Appl. No.: 15/214,069

(22) Filed: Jul. 19, 2016

(65) Prior Publication Data

US 2017/0033351 A1 Feb. 2, 2017

(30) Foreign Application Priority Data

Jul. 30, 2015 (JP) ................................ 2015-151178

(51) Int. Cl.
*H01M 10/26* (2006.01)
*H01M 4/48* (2010.01)
(Continued)

(52) U.S. Cl.
CPC ............ *H01M 4/364* (2013.01); *H01M 4/48* (2013.01); *H01M 4/623* (2013.01); *H01M 4/625* (2013.01); *H01M 4/661* (2013.01); *H01M 4/808* (2013.01); *H01M 8/083* (2013.01); *H01M 10/26* (2013.01); *H01M 12/08* (2013.01); *H01M 10/30* (2013.01); *H01M 2004/027* (2013.01); *H01M 2300/0014* (2013.01); *Y02E 60/124* (2013.01); *Y02E 60/128* (2013.01)

(58) Field of Classification Search
None
See application file for complete search history.

(56) References Cited

U.S. PATENT DOCUMENTS 4,438,185 A * 3/1984 Taskier .................. B01D 69/12
427/245
5,318,866 A 6/1994 Degen
(Continued)

FOREIGN PATENT DOCUMENTS

JP 53-001626 1/1978
JP 60136182 A2 7/1985
(Continued)

OTHER PUBLICATIONS

Machine Translation of JP 10-021,956 (previously cited in the IDS of Jul. 19, 2016) (Year: 1998).*

*Primary Examiner* — Tracy M Dove
(74) *Attorney, Agent, or Firm* — Rankin, Hill & Clark LLP (57) ABSTRACT

An alkaline storage battery contains: a positive electrode; a negative electrode containing, as an active material, at least one of a metal capable of forming a dendrite and a metal compound thereof; and an alkaline electrolyte. The alkaline electrolyte contains a compound which is a chain saturated hydrocarbon at least partially having a hydrophilic functional group other than a hydroxyl group and having a molecular weight of 400 or more and less than 220000 in an amount of less than 15 g per 100 mL of the electrolyte.

6 Claims, 3 Drawing Sheets

(51) Int. Cl.
*H01M 4/36* (2006.01)
*H01M 4/62* (2006.01)
*H01M 4/66* (2006.01)
*H01M 4/80* (2006.01)
*H01M 8/083* (2016.01)
*H01M 12/08* (2006.01)
*H01M 10/30* (2006.01)
*H01M 4/02* (2006.01)

(56) References Cited

U.S. PATENT DOCUMENTS

| | | | | |
|---|---|---|---|---|
| 5,830,601 A | * | 11/1998 | Lian | H01M 4/244 429/347 |
| 6,060,196 A | | 5/2000 | Zecevic | |
| 6,544,686 B1 | * | 4/2003 | Ein-Eli | H01M 4/244 429/206 |
| 2002/0182489 A1 | * | 12/2002 | Cheiky | H01M 10/32 429/144 |
| 2003/0215707 A1 | | 11/2003 | O Hara | |

FOREIGN PATENT DOCUMENTS

| | | |
|---|---|---|
| JP | 62170174 A2 | 7/1987 |
| JP | 6275310 A2 | 9/1994 |
| JP | 6349473 A2 | 12/1994 |
| JP | 7161375 A2 | 6/1995 |
| JP | 8195229 A2 | 7/1996 |
| JP | 10021956 A2 | 1/1998 |
| JP | 2002501287 | 1/2002 |
| JP | 2002305040 A2 | 10/2002 |
| JP | 2003-031199 | 1/2003 |
| JP | 2003297375 A2 | 10/2003 |
| JP | 2003534638 | 11/2003 |
| JP | 2005123059 A2 | 5/2005 |
| JP | 2009093983 A2 | 4/2009 |
| JP | 2013084349 A1 | 5/2013 |
| JP | 2014-029818 | 2/2014 |
| JP | 2014192066 A2 | 10/2014 |

* cited by examiner

ALKALINE STORAGE BATTERY

CROSS-REFERENCE TO RELATED APPLICATIONS

This application claims the benefit of Japanese patent application No. 2015-151178 filed on Jul. 30, 2015, which is incorporated by reference.

FIELD

The present invention relates to an alkaline storage battery.

BACKGROUND

In recent years, with the progress in reduction in size and weight of electronic equipment, high energy density batteries have been increasingly required as power supplies. Advantageously, for such batteries, negative active materials such as Zn, Mg, Cd, Al, Ca, and Fe have a high energy density and power density per unit mass. Furthermore, those negative active materials are inexpensive and have excellent safety. The possibilities of the batteries as power supplies for electronic equipment or on-vehicle power supplies have been studied.

However, a negative electrode containing Zn (zinc) or the like as an active material may cause the generation of hydrogen gas resulting from a side reaction during charge, and the growth of a dendrite due to the high solubility of zinc in an electrolyte may result in the penetration short-circuit of a separator. These may cause a short charge-discharge cycle life.

JP-A-2013-84349 discloses "an electrolyte solution for alkaline batteries comprising at least an organic matter having two or more carbon atoms and one or more hydroxyl groups in a molecule" and "the alkaline battery is an air-zinc secondary battery or a nickel-zinc secondary battery." See claims 1, 7 and 8.

An object of JP-A-2013-84349 is to "provide an electrolyte solution for alkaline batteries and alkaline battery which can suppress the generation of hydrogen gas resulting from a side reaction, dendrite formed during the precipitation of zinc, and the shape change of zinc to achieve a long-term charge-discharge cycle and excellent charge-discharge efficiency." See paragraph [0007].

Also, it is disclosed that "the number of the hydroxyl groups is preferably 5 or less," and examples of the organic matter include monohydric alcohols, dihydric alcohols, and trihydric alcohols having 2-6 carbon atoms. See paragraphs [0017], [0019] and [0020].

JP-A-2009-93983 discloses "a secondary battery comprising a negative electrode, a positive electrode, and an electrolyte solution interposed therebetween, wherein the negative electrode contains a material for absorbing and desorbing metal ions as a negative active material; and the electrolyte solution contains at least one dendrite formation inhibitor selected from the group consisting of polyalkylene imines, polyallylamines, and asymmetrical dialkyl sulfones" and "the secondary battery wherein the negative electrode contains a material selected from the group consisting of zinc, magnesium, aluminum, and an alloy thereof." See claims 1 and 6.

It is a main object of JP-A-2009-93983 to "provide a secondary battery which can suppress the formation of dendrite to repeatedly carry out discharge and charge." See paragraph [0005].

It is disclosed that, as an example of an alkaline secondary battery, an air battery including a 6N hydroxide aqueous solution obtained by adding 1% by weight of polyethyleneimine (PEI) to an electrolyte solution, and a zinc negative electrode is assembled, which can suppress the formation of dendrite and repeatedly carry out discharge and charge. See paragraph [0018].

JP-A-2003-297375 discloses "an alkaline zinc battery comprising a negative electrode containing zinc or a zinc alloy as a negative active material, a positive electrode, a separator, and an alkaline electrolyte solution, wherein the alkaline electrolyte solution contains 10 to 30% by weight of a potassium hydroxide aqueous solution and a cationic organic matter" "the cationic organic matter is any one or more of a quaternary ammonium salt, a quaternary phosphonium salt, and a tertiary sulfonium salt," and "the alkaline zinc battery is a secondary battery." See claims 1, 2 and 7.

An object of JP-A-2003-297375 is to "prevent the expansion and leakage of a battery caused by the generation of hydrogen gas, and the internal short-circuit of the battery caused by the non-uniform dendritic or spongiform zinc growth in a zinc negative electrode to achieve an alkaline zinc secondary battery having excellent leakage properties and cycle life." See paragraph [0076].

In examples for the alkaline zinc secondary battery "n-dodecyltrimethylammonium chloride" and a long-chain alkyltrimethylammonium salt are disclosed as the cationic organic matter added to an electrolyte solution. See paragraph [0171] to [0245]. Further, it is proposed that "in order to certainly dissolve 0.1 M or more and a saturated amount or less of the cationic organic matter, the concentration of a potassium hydroxide aqueous solution is preferably set to 30% by weight or less". See paragraph [0216] Also, it is disclosed that "it is found that when the number of the carbon atoms of the long-chain alkyl group of the cationic organic matter is 3 or more, the leakage and internal short-circuit of the alkaline zinc secondary battery are remarkably suppressed," and "however, since the discharged capacity is decreased when the number of the carbon atoms of the substituent group is more than 15, and particularly 21 or more, the number of the carbon atoms of the long-chain alkyl group of the cationic organic matter is preferably 3 to 20, and particularly preferably 3 to 15." See paragraph [0229].

JP-A-2003-534638 discloses "a button electrochemical cell comprising: a positive electrode case; a gasket; a negative electrode cup having a sealing surface for contact with the gasket, the sealing surface having thereon no non-in situ-deposited metal with a hydrogen overvoltage higher than that of copper; a positive electrode; an aqueous alkaline electrolyte solution; and zinc causing low gas generation and producing 0.5 cc or less gas per 5 g of zinc after 24 hours at, 71° C. in an aqueous solution of 45% by mass KOH, wherein the cell is free of added mercury," and "the electrolyte solution further comprises a polyethylene glycol compound." See claims 1 and 8.

An object of JP-A-2003-534638 is to provide "a zero mercury button electrochemical cell which is free of added mercury, highly resistant to leakage and salting, and yet cost-effective to manufacture and commercialize, and provides satisfactory electrical performance," See paragraph [0002].

JP-A-60-136182 discloses "an air battery including a gel-like zinc negative electrode obtained by mixing amalgamated zinc powder, an alkaline electrolyte solution, and a gelling agent." Also, it is proposed that "the alkaline electrolyte solution comprises 0.3 to 3 wt % of an aqueous solution of caustic soda or caustic potash having a solution concentration of 4 to 12 mol/l; and the gelling agent comprises 0.3 to 3 wt % of a carboxyvinyl polymer having a molecular weight of 100,000 to 5,000,000."

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In the alkaline secondary batteries including the negative electrode which contains zinc as the active material as disclosed in JP-A-2013-84349, 2009-93983, and 2003-297375, the specific compounds are added to the electrolyte in order to suppress the generation of hydrogen gas, formation of dendrite, and shape change or the like which cause deterioration in charge-discharge cycle performance.

However, the additive described in JP-A-2013-84349 has insufficient stability at a high potential, and cannot be put into practical use.

The additives disclosed in JP-A-2009-93983 and 2003-297375 are stable, but these have insufficient solubility in an alkaline solution. A high-alkaline electrolyte cannot be used, or the additive amount thereof is limited.

An object of JP-A-2003-534638 is to provide the battery having the mercury additive-free zinc and the alkaline electrolyte for leakage and salting resistances, wherein the electrolyte contains the polyethylene glycol compound. JP-A-60-136182 uses the negative electrode obtained by mixing the amalgamated zinc powder, the alkaline electrolyte, and the carboxyvinyl polymer as the gelling agent in the zinc-air battery. However, the relation between the polyethylene glycol compound or the carboxyvinyl polymer and the charge-discharge cycle performance in the storage battery is not shown at all.

An object of the present invention is to provide an alkaline storage battery having excellent charge-discharge cycle performance by adding a compound having high stability and high solubility in a high alkaline solution to an electrolyte.

An alkaline storage battery according to a first aspect of the present invention includes a negative electrode containing, as an active material, at least one of a metal capable of forming a dendrite and a metal compound thereof; and an alkaline electrolyte, wherein the alkaline electrolyte contains a compound which is a chain saturated hydrocarbon at least partially having a hydrophilic functional group other than a hydroxyl group and having a molecular weight of 400 or more and less than 220000 in an amount of less than 15 g per 100 mL of the electrolyte.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An alkaline storage battery according to a first aspect of the present invention includes a negative electrode containing, as an active material, at least one of a metal capable of forming dendrite and a metal compound thereof (a metal compound of the metal capable of forming dendrite); and an alkaline electrolyte, wherein the alkaline electrolyte contains a compound which is a chain saturated hydrocarbon at least partially having a hydrophilic functional group other than a hydroxyl group and having a molecular weight of 400 or more and less than 220000 in an amount of less than 15 g per 100 mL of the electrolyte.

The compound may be brought into contact with at least the positive electrode.

The hydrophilic functional group other than a hydroxyl group may be a carboxyl group, a sulfone group, or a side chain having a hydroxyl group in carbon at or after an α position with respect to a carbon main chain which is a longest carbon chain of the compound and represented by formula of $C_nH_{2n\cdot m+1}(OH)_m$ (n and m are integers of 1 or more).

A group bonded to the carbon main chain in the compound may be a hydrophilic functional group other than a hydroxyl group.

At least a part of groups bonded to the carbon main chain in the compound may be a hydroxyl group.

The metal capable of thrilling dendrite may be at least one of Zn, Mg, Cd, Al, Ca, and Fe.

The present invention can provide an alkaline storage battery having excellent charge-discharge cycle performance by employing the means described above.

The present invention focuses attention on a compound added to an alkaline electrolyte in order to suppress the formation of dendrite in an alkaline storage battery in which an active material of a negative electrode is a metal capable of forming dendrite and a metal compound thereof.

The phrase "at least one of a metal capable of forming dendrite and a metal compound thereof" is at least one of a base metal such as Zn, Mg, Cd, Al, Ca, Fe, an alloy thereof, and a metal compound thereof, and means a metal capable of forming dendrite and a metal compound thereof when being dissolved and precipitated in an alkaline electrolyte.

By adding the compound according to the present invention to the alkaline electrolyte, the formation of dendrite when at least one of the metal and the metal compound thereof as the negative active material are dissolved and precipitated can be suppressed, which provides the improvement in the cycle characteristics of the alkaline storage battery. Among these, when the negative active material is at least one of Zn, Cd, Fe and the metal compound thereof, the compound according to the present invention is used preferably. When the negative active material is Zn and/or a zinc compound, the compound according to the present invention is used more preferably.

The negative electrode preferably contains mercury thallium, indium, bismuth, calcium, or lead hydroxide and oxide or the like which provide a high hydrogen overvoltage in order to improve self-discharge characteristics in the charging state of the negative active material and during storing in the charged state.

The compound according to the present invention is added to the electrolyte in order to suppress the formation of dendrite from the negative electrode. Since the electrolyte is brought into contact with both positive and negative electrodes, the compound contained in the electrolyte is also brought into contact with a positive electrode having a high potential unless special means such as a barrier membrane are used for a separator. Then, first, the present inventors studied the relation between a molecular weight and stability at a high potential for the compound added to the electrolyte of the alkaline storage battery.

Propylene glycol (PG) disclosed in JP-A-2013-84349 and 1 g of a compound having various molecular weights are added to 100 mL of a 4M potassium hydroxide solution (4M KOH), and cyclic voltammetry was measured with a nickel foil (2 cm×2 cm) used as a test electrode, a scan speed set to 1 mV/s, and a scan range set to 0.70 V (vs. Hg/HgO) from a circuit potential (OCP).

Figure 1:
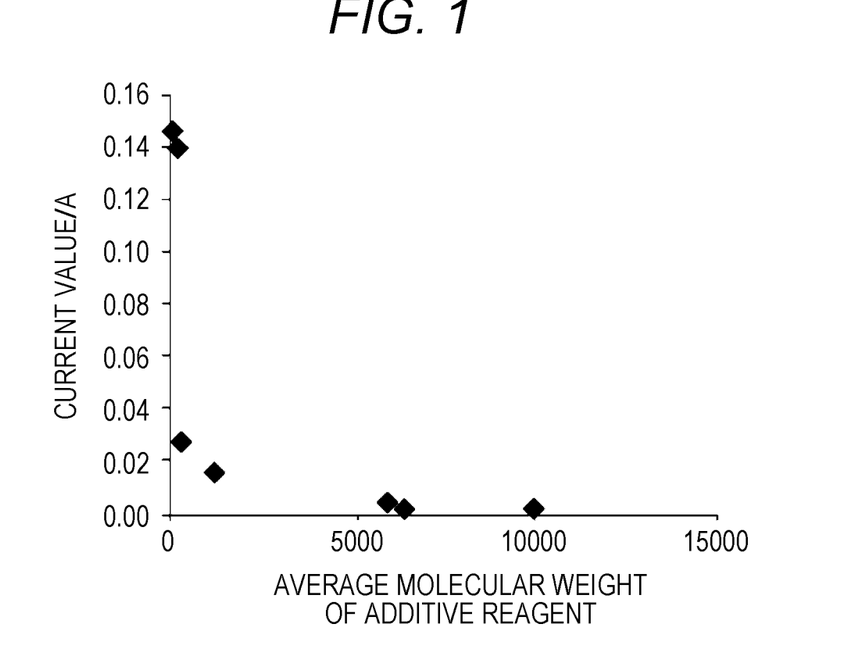
FIG. 1 is a graph showing the relation between the molecular weight of a compound added to an electrolyte and a current generated at a high potential.
Figure 2:
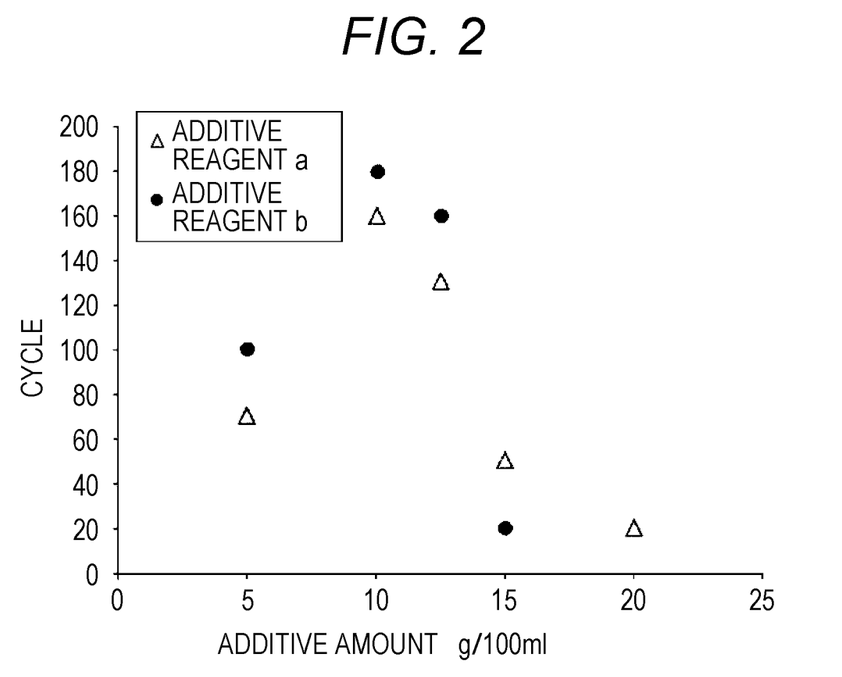
FIG. 2 is a graph showing the relation between the additive amount of an additive and the number of cycles representing a cycle life.

The molecular weights of the compounds and current values generated at a potential of 0.6 V (vs. Hg/HgO) are shown in Table 1 and FIG. 1.

TABLE 1

| Sample No. | Kind of additive reagent | Molecular weight | Current value (A) |
|---|---|---|---|
| 1 | Propylene glycol | 76 | 0.146 |
| 2 | Polyethylene glycol | 200 | 0.139 |
| 3 | Polyethylene glycol | 400 | 0.027 |
| 4 | Polyethylene glycol | 1300 | 0.015 |
| 5 | Modified polyvinyl alcohol | 6000 | 0.004 |
| 6 | Modified polyvinyl alcohol | 6500 | 0.002 |
| 7 | Modified polyvinyl alcohol | 10000 | 0.002 |
| 8 | No additive reagent | — | 0.001 |

The molecular weight and average molecular weight in the present specification are a weight average molecular weight. The weight average molecular weight was calculated from molecular weight distribution measurement according to a gel permeation chromatography method and a mass spectrometry method. When the molecular weight was 1000 or more, the distribution of the molecular weight was measured using the gel permeation chromatography method. When the molecular weight was less than 1000, the distribution was measured using the mass spectrometry method.

An LC-2000Plus type system manufactured by JASCO Corporation was used for the gel permeation chromatography method, and OHPaK SB-805 HQ+SB-804 HQ was used as a column. Measurement was carried out with a 0.1 M NaNO$_3$ aqueous solution used as a solvent, a flow rate set to 0.5 mL/min, and a column temperature set to 40° C.

JMS-T100GCV manufactured by JEOL was used for mass spectrometry. Measurement was carried out with a cathode voltage set to 10 kV an emitter current set to 0 mA-51.2 mA/min-35 mA, methanol used as a solvent, and a measurement mass range (m/z) set to 10 to 3000.

In compounds of sample Nos. 1 and 2 having molecular weights of 76 and 200, a current of 0.13 A or more was generated. The current is considered to be generated from the decomposition of the compound at a high potential. On the other hand, in compounds of sample Nos. 4 to 7 having molecular weights of 400 or more, a current was 0.03 A or less at a high potential. Therefore, the compounds having molecular weights of 400 or more were confirmed to have high stability at a high potential.

Since a current is generated by oxygen generation (decomposition of water) in a range in which a potential exceeds 0.6 V (vs. Hg/HgO), stability is adequately evaluated at 0.6 V (vs. Hg/HgO).

From the results, the following was confirmed. The charge potential of a positive electrode leads to 0.6 V (vs. Hg/HgO) in an alkaline storage battery in which an air electrode or a nickel electrode is used as the positive electrode, so that it difficult to actually use an electrolyte containing PG, and it is necessary to select a compound having a large molecular weight from the aspect of stability.

In the consideration process, it was found that when the molecular weight of the compound is increased, even a compound having a hydroxyl group as a hydrophilic functional group has low solubility in a high alkaline solution. For example, the addition of 2.5 g of polyethylene glycol having a molecular weight of 600 to 100 mL of 4M KOH caused the white turbidity of the solution. The addition of 1 g of polyvinyl alcohol having a molecular weight of 6000 or more to 100 mL of 4M KOH: caused the white turbidity of the solution. Therefore, it was necessary for the samples 5 to 7 to replace at least a part of hydroxyl groups in polyvinyl alcohol by carboxyl groups for modification in order to increase solubility.

In order to suppress the self-discharge of zinc or the like used for the negative active material, the electrolyte preferably has higher alkalinity. However, when a compound having low solubility is used, the additive amount thereof to the high alkaline electrolyte should be limited, or the alkalinity of the electrolyte should be lowered, which cannot provide sufficient charge-discharge cycle performance.

Then, the present inventors searched additives having high stability at a high potential and having high solubility in a high alkaline electrolyte, and found that a compound which is a chain saturated hydrocarbon at least partially having a hydrophilic functional group other than a hydroxyl group and having a molecular weight of 400 or more and 200000 or less has high solubility in a high alkaline solution, to improve charge-discharge cycle performance.

Specifically, a compound having a monomer unit of the following formula (1) is preferable,

[Chemical Formula 1]

Formula (1)

(R is hydrogen, halogen, or an alkyl group, and at least a part of A and B has a hydrophilic functional group other than a hydroxyl group.)

R in the formula (1) may contain functional groups other than the above as long as the effect of the invention is not inhibited. As long as the effect of the invention is not inhibited, the structure of the chain saturated hydrocarbon may contain an amide bond and an ester bond or the like.

Examples of the hydrophilic functional group other than a hydroxyl group include a carboxyl group, a sulfone group, and a side chain having a hydroxyl group in carbon at or after an ex position with respect to a carbon main chain (longest carbon chain) of the compound and represented by formula of $C_nH_{2n \cdot m+1}(OH)_m$. See Examples 1 to 6 described later.

The compound includes a compound obtained by substituting at least a part of hydroxyl groups of A or B in polyvinyl alcohol (PVA) by another hydrophilic functional group when R of a monomer unit represented by the formula (1) is hydrogen. The compound includes "modified polyvinyl alcohols" of sample Nos. 5 to 7 shown in Table 1 which correspond to an additive reagent f and additive reagent b described later.

The reason why PVA having a hydroxyl group which is a hydrophilic functional group has low solubility in the high alkaline solution is inferred to be that the PVA has the repeated structure of an identical monomer unit to develop hydrogen bonds, thereby providing high crystallinity. See Comparative Example 2 described later.

On the other hand, it is inferred that when a part of the hydroxyl groups in PVA is substituted by the hydrophilic functional group other than a hydroxyl group, the regularity of molecules is disturbed, and the PVA has lower crystallinity than that of PVA having the identical repeated monomer unit to provide high solubility. See Example 3 to 5 described later.

When all the hydrophilic functional groups including hydroxyl groups even slightly contain the hydrophilic functional groups other than hydroxyl groups, the regularity of the hydrophilic functional groups are effectively disturbed in the compound. When the molar ratio of the hydrophilic functional group other than hydroxyl groups to all the hydrophilic functional groups including hydroxyl groups is 2.1% or more, the effect can be clearly provided. See Example 4 described later.

The total of the hydrophilic functional groups including hydroxyl groups is contained in the compound to the extent that the compound can be dissolved in the alkaline solution. It is preferred that 25 mol % or more of groups bonded to the carbon of the carbon main chain of the compound are the hydrophilic functional groups from the viewpoint of solubility.

Examples of the compound includes a compound having repeated monomer units in which A in the formula (1) is a hydrophilic functional group other than a hydroxyl group and B is hydrogen (see Example 2 described later) and a compound having the monomer unit and a monomer unit in which B is a hydrophilic functional group other than a hydroxyl group. See Example 1 described later. It is inferred that the solubility is increased since the ratio of the hydrophilic functional group other than a hydroxyl group existing in the compound is large in these cases.

Examples of the compound include also a compound having a monomer unit in which A or B in the formula (1) is a hydrophobic group. See Example 6 described later. Also in this case, it is inferred that the solubility is secured since the abundance ratio of the hydrophilic functional group other than a hydroxyl group in the compound is high.

The additive amount of the compound to the electrolyte is different depending on the molecular weight or the kind of hydrophilic group, but according to Examples described later, the additive amount is preferably 2.5 g or more and less than 15 g, and particularly preferably 5 g or more and 12.5 g or less, per 100 mL of the electrolyte.

The additive amount of 2.5 g/100 mL or more can improve charge-discharge cycle performance. The additive amount of less than 15 g/100 mL can prevent the excessive increase in the viscosity of the electrolyte.

The molecular weight of the compound is preferably 400 or more and less than 220000, and more preferably 1000 or more and 100000 or less according to the results shown in FIG. 1 and Examples described later.

By setting the molecular weight to 400 or more, the decomposition of the compound caused by applying a high potential can be prevented to secure the stability. By setting the molecular weight to less than 220000, the decrease in ion conductivity caused by the excessive increase in the viscosity of the electrolyte can be prevented.

For example, as the electrolyte in the present invention, one in which an alkali metal hydroxide is dissolved in water can be used. Examples of the alkali metal hydroxide include KOH, NaOH, and LiOH. These can be used alone or in combination of two or more types. The concentration of the hydroxide is preferably within the range of 3 M to 9 M, and more preferably 4 to 6 M. By setting the concentration to 3 M or more, the self-discharge can be suppressed. By setting the concentration to 9 M or less, the increase in the viscosity of the electrolyte can be suppressed.

When the negative active material is Zn and/or a zinc compound, the electrolyte of the alkaline storage battery preferably contains zinc oxide in a saturating concentration. The electrolyte contains zinc oxide, and thereby the elution of the negative active material can be suppressed.

The negative electrode can he produced as follows. For example, a paste is produced by adding water and a binder such as polytetrafluoroethylene or styrene-butadiene rubber to powder of a negative active material, for example, powder made of acetylene black being a conductive agent, and lead oxide or thallium oxide or the like being a self-discharge inhibitor. The paste is filled in a substrate made of copper foam or nickel foam or the like, or applied to a perforated steel plate, and sufficiently dried. Then, the resulting material is subjected to a rolling process, and cut.

At a potential of 0.6 V (vs. Hg/HgO) at the charge end of the nickel electrode or air electrode, the compound can suppress the decomposition of the electrolyte. Therefore, the compound is suitably added to the electrolyte in a nickel-metal storage battery in which a positive electrode is a nickel electrode or an air electrode, or an air-metal storage battery.

The nickel electrode can contain a current collector made of a metal hydroxide containing nickel oxyhydroxide as a main ingredient and nickel foam or the like, for example. The air electrode can be made of a carbon material, an oxygen reducing catalyst, and a binder, for example.

Cellophane used for a conventional alkaline zinc storage battery, a polyvinyl alcohol membrane having a cross-linked structure, and a polyolefin membrane or the like can be used as a separator in the alkaline storage battery of the present invention. A separator having a composite structure in which a nonwoven fabric separator made of PE or PP or the like is laminated on a microporous membrane separator made of polyethylene (PE) or polypropylene (PP) or the like is particularly preferable in order to prevent short-circuit caused by dendrite.

Figure 3:
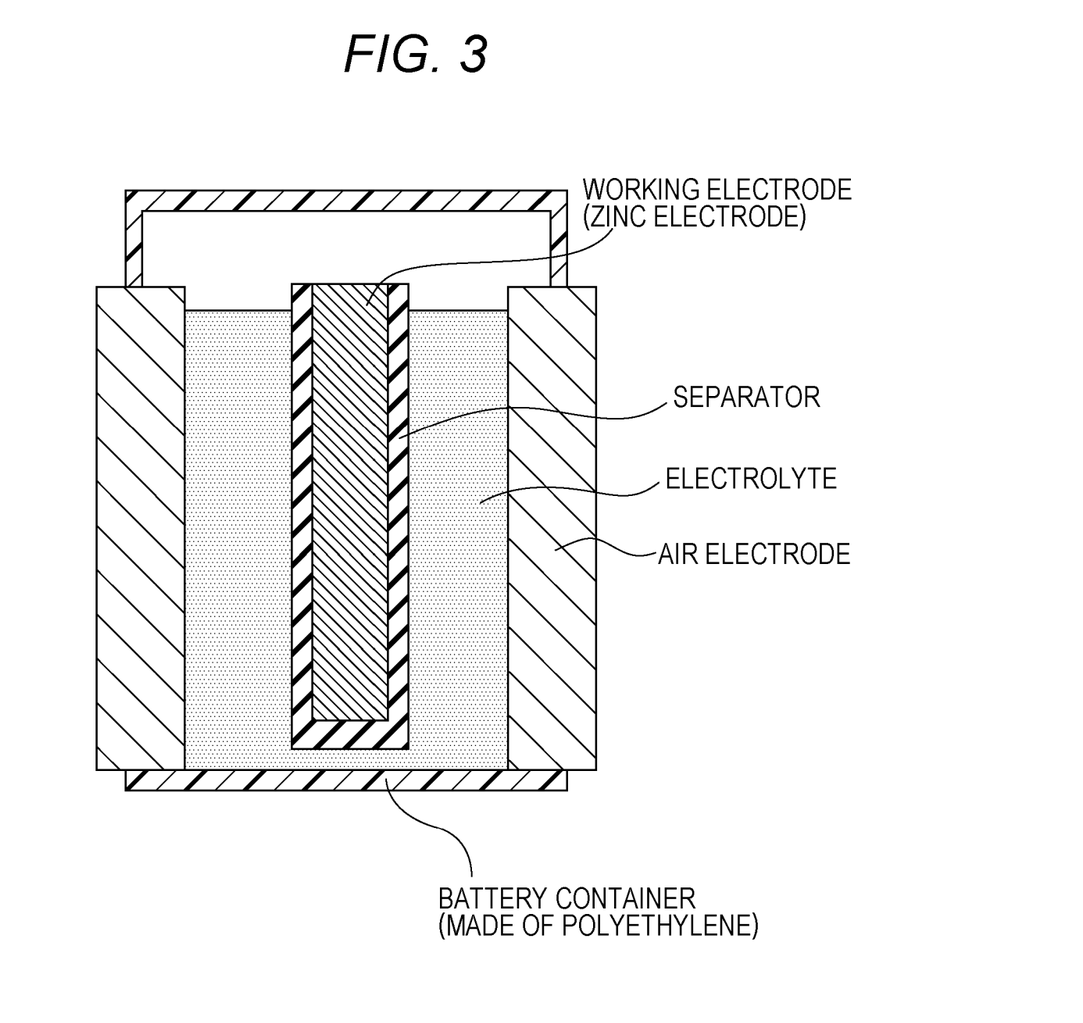
FIG. 3 is a schematic view of an open type alkaline storage battery.

FIG. 3 shows a typical constructional example of an alkaline storage battery according to the present invention, and the alkaline storage battery has an open type cell structure in which an air electrode is used as a counter electrode (positive electrode) and a zinc electrode is used as a working electrode (negative electrode).

Hereinafter, Examples of the alkaline storage battery including the zinc electrode as the negative electrode will be shown. However, as a matter of course, the present invention is not limited to Examples.

EXAMPLES

Example 1

<Production of Alkaline Electrolyte>

KOH powder was dissolved in pure water to produce an alkaline aqueous solution. The alkaline aqueous solution was adjusted so as to contain 5 g of a chain saturated hydrocarbon compound having a molecular weight of 10000 (hereinafter, referred to as an "additive reagent a") in 100 mL of 4M KOH. The chain saturated hydrocarbon compound contains 90 mol % of a monomer unit in which A in the following formula (1) was a carboxyl group and B was hydrogen and 10 mol % of a monomer unit in which A and B was a carboxyl group. Furthermore, an excessive amount of ZnO powder was added, and the mixture was stirred at 25° C. for 24 h. Then, by removing the excess ZnO by filtering, an electrolyte according to Example 1 was produced as a zinc saturated alkaline electrolyte.

[Chemical Formula 2]

Formula (1)

The molecular structure of the compound of the present specification was analyzed by an FT-NMR method (device: AL400 manufactured by JEOL). An organic matter obtained by evaporating the solvent of the alkaline electrolyte was dissolved in heavy water ($D_2O$) as a measurement solvent. Furthermore, sodium 3-(trimethylsilyl)-1-propanesulfonate (DSS) was added as a reference substance to measure the spectra of and $^1$H-NMR and $^{13}$C-NMR.

<Production of Negative Electrode>

Predetermined amounts of ZnO powder, acetylene black (AB), and PbO powder were weighed, and stirred. Then, water and a polytetrafluoroethylene (PTFE) dispersion were added, and these were stirred to produce a paste. ZnO:AB:PTFE:PbO=88:5:5:2 (mass %) was set as a solid content, and a moisture percentage was adjusted to 65 mass % with relative to the total of the paste. The paste was filled in a copper foam substrate having a thickness of 1 mm and a density per area of 0.45 g/cm², and sufficiently dried. The resulting material was then subjected to a rolling process. Thereby, a 0.35-mm-thick ZnO electrode sheet was obtained. A ZnO electrode (zinc negative electrode) was obtained by cutting the substrate to 2 cm×2 cm. The filing amount of the paste was adjusted so that the theoretical capacity of the zinc negative electrode (electrode plate) was set to 100 mAh.

<Production of Counter Electrode>

A ZnO electrode was used also for a counter electrode in order to reduce the influence of the counter electrode on the zinc negative electrode. Zn powder was added to the raw material of the zinc negative electrode as described above so that Zn:ZnO:AB:PTFE:PbO=54:34:5:5:2 (mass %) was set as the blending ratio of the paste. The counter electrode was produced in the same manner as in the zinc negative electrode except that the area of the electrode plate was set to 2.5 cm×3.0 cm and the paste was filled so that the electrode capacitance was excessive to that of the zinc negative electrode.

<Production of Cell>

A microporous membrane separator made of polypropylene was disposed on each of both sides of the zinc negative electrode and counter electrode produced as described above. Furthermore, a nonwoven fabric separator including fibers including polyethylene and polypropylene was laminated on the microporous membrane separator. The counter electrode was disposed on each of both sides of the zinc negative electrode, and the laminated product was set in a container. A Hg/HgO electrode was provided as a reference electrode. The alkaline electrolyte prepared as described above was injected to so that the electrode was sufficiently filled with the alkaline electrolyte (2.5 mL). Then, the resulting product was left until the electrolyte sufficiently permeated the electrode. Thereby, an open type test cell was produced.

Examples 2 to 6

Test cells according to Examples 2 to 6 were produced in the same manner as in Example 1 except that compounds ("additive reagent b" to "additive reagent f") shown in Table 2 were added to prepare electrolytes in place of an additive reagent a.

Comparative Example 1

An electrolyte according to Comparative Example 1 was prepared in the same manner as in Example 1 except that an additive reagent (a) was not added, and a test cell was produced.

Comparative Examples 2 and 3

When compounds ("additive reagent g" and "additive reagent h") shown in Table 2 were added to 4M KOH in place of an additive reagent a, the addition of 2.5 g of the additive reagent g caused the white turbidity of the liquid in Comparative Example 2, and the additive reagent g was insoluble. In Comparative Example 3, the electrolyte gelled by the addition of 1 g of the additive reagent h. A test cell according to Comparative Example 3 was produced in the same manner as in Example 1 using the electrolyte in the gel state.

<Evaluation of Cycle Characteristics>

The test cells according to Examples and Comparative Examples were subjected to a cycle test at 25° C. under the following conditions.

The test cells were subjected to discharge and charge at the first cycle under the following conditions.

The test cells were charged for 1 hour with a current set to 0.25 CmA (25 mA), paused for 5 minutes, and then discharged to −0.8 V with respect to a reference electrode.

The following conditions were repeated for the second and subsequent cycles.

The test cells were charged for 1 hour with a current set to 0.5 CmA (50 mA), paused for 5 minutes, and then discharged to −0.8 V with respect to a reference electrode.

The test cells were subjected to the cycle test under the above conditions, and the number of cycles when the discharged capacity of each of the test cells was started to be rapidly decreased was defined as a cycle life. The number of cycles when short-circuit was caused by the formation of dendrite was also defined as a cycle life.

The results of the cycle tests of the test cells according to Examples 1 to 6 and Comparative Examples 1 and 2 are shown in Table 2 together with the kinds of groups of A and B, molar ratios, molecular weights, and additive amounts (g/100 mL) of the additive reagents.

TABLE 2

| | Compound | A | B | Molecular weight | Additive amount (g/100 mL) | Number of cycles (times) |
|---|---|---|---|---|---|---|
| Example 1 | Additive reagent a | Carboxyl group | Hydrogen:Carboxyl group = 90:10 | 10000 | 5 | 70 |
| Example 2 | Additive reagent b | Carboxyl group | Hydrogen | 10000 | 5 | 100 |
| Example 3 | Additive reagent c | Hydroxyl group:Carboxyl group = 90:10 | Hydrogen | 10000 | 5 | 120 |
| Example 4 | Additive reagent d | Hydroxyl group:Sulfone group = 97.9:2.1 | Hydrogen | 13000 | 5 | 120 |
| Example 5 | Additive reagent e | Hydroxyl group:—CH(OH)—CH$_2$(OH) = 96.5:3.5 | Hydrogen | 13000 | 5 | 100 |
| Example 6 | Additive reagent f | Isobutylene group:Carboxyl group = 50:50 | Hydrogen:Carboxyl group = 50:50 | 6000 | 5 | 60 |
| Comparative Example 1 | No addition | — | — | — | 0 | 50 |
| Comparative Example 2 | Additive reagent g | Hydroxyl group | Hydrogen | 11000 | 2.5 | Test-incapable |
| Comparative Example 3 | Additive reagent h | Carboxyl group | Hydrogen | 220000 | 1 | 40 |

When the compound according to the present invention was not added to the electrolyte as in Comparative Example 1, the number of cycles which reached the cycle life was 50. Since the additive reagent was insoluble in the electrolyte in Comparative Example 2, the test cell could not be produced, and could not be subjected to the cycle test. In Comparative Example 3, the additive reagent functioned as a gelling agent, and the number of cycles of Comparative Example 3 was less than that of Comparative Example 1 containing no additive reagent.

On the other hand, in Examples 1 to 6 in which 5 g of the additive reagents a to g were added to 100 mL of 4M KOH, the number of cycles which reached the cycle life exceeded 50.

In all of Examples 1 to 6, the compound in which R in the formula (1) was hydrogen was used as the additive reagent. In view of these Examples, 25 mol % or more of the groups bonded to the carbon of the carbon main chain are considered to be preferably a hydroxyl group and a hydrophilic functional group other than the hydroxyl group.

The test cells of Example 3 and Comparative Example 1 were subjected to 20 cycles of discharge and charge under the same conditions as those of the cycle test, and the microporous membrane separator brought into contact with the negative electrode was then taken out. The photographs of the separators of Example 3 and Comparative Example 1 are respectively shown in FIGS. 4 and 5.

Figure 4:
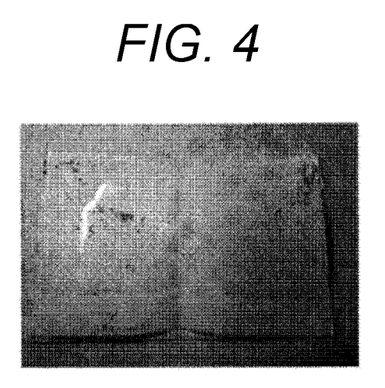
FIG. 4 is a photograph showing dendrite formed on a separator according to Example of the present invention.
Figure 5:
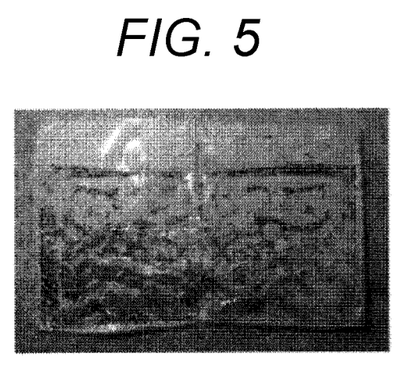
FIG. 5 is a photograph showing dendrite formed on a separator according to Comparative Example of the present invention.

A number of black portions in which zinc was deposited were observed in FIG. 5, but the black portions were hardly observed in FIG. 4, and thus it was confirmed that the precipitation of zinc was suppressed in Example 3.

Examples 7 to 10 and Comparative Examples 3 to 5

Alkaline electrolytes according to Examples 7 to 10 and Comparative Examples 3 to 5 were prepared in the same manner as in Example 1 except that the additive reagent a used in Example 1 and the additive reagent b used in Example 2 were added in additive amounts shown in Table 3 to 100 mL of a zinc saturated alkaline electrolyte of 4M KOH to produce test cells.

The results of the cycle tests of the test cells according to Examples 7 to 10 and Comparative Examples 3 to 5 are shown in the following Table 3 together with the results of Examples 1 and 2.

TABLE 3

| | Kind of additive | Additive amount (g/100 ml) | Number of cycles (times) |
|---|---|---|---|
| Example 1 | Additive reagent a | 5 | 70 |
| Example 7 | | 10 | 160 |
| Example 8 | | 12.5 | 130 |
| Comparative Example 3 | | 15 | 50 |
| Comparative Example 4 | | 20 | 20 |
| Example 2 | Additive reagent b | 5 | 100 |
| Example 9 | | 10 | 180 |
| Example 10 | | 12.5 | 160 |
| Comparative Example 5 | | 15 | 20 |

According to the results of the cycle test, the content of the additive reagent in 100 mL of KOH is preferably less than 15 g. However, in a cycle test employing a different rate, the effect of the additive reagent was confirmed even when the content of the additive reagent was 15 g or more.

Since the cycle life of the zinc alkaline storage battery is remarkably improved by using the alkaline electrolyte solution containing the compound according to the present invention, the alkaline storage battery is expected to be used as power supplies for electronic equipment and electric vehicles or the like.

What is claimed:
1. An alkaline storage battery comprising:
a positive electrode;
a negative electrode containing, as an active material, at least one of a metal capable of forming a dendrite and a metal compound thereof; and
an alkaline electrolyte,
wherein the alkaline electrolyte contains a compound which is a chain saturated hydrocarbon having a hydroxyl group and a functional group selected from the group consisting of a carboxyl group, a sulfone group and -CH(OH)-CH$_2$(OH) and having a molecular weight of 400 or more and less than 220000 in an amount of 2.5 g or more and less than 15 g per 100 mL of the electrolyte, and the compound has a plurality of monomer units, each of the plurality of monomer units being the following formula:

where R includes hydrogen, halogen or an alkyl group, and A or B in at least one of the plurality of monomer units is the hydroxyl group, and A or B in at least another one of the plurality of monomer units is the functional group selected from the group consisting of the carboxyl group, the sulfone group and -CH(OH)-CH$_2$(OH) and wherein each remaining A and B in the formula is independently one selected from a group consisting of hydrogen, the hydroxyl group, a hydrophobic group and the functional group selected from the group consisting of the carboxyl group, the sulfone group and -CH(OH)-CH$_2$(OH).

2. The alkaline storage battery according to claim 1, wherein the compound is brought into contact with at least the positive electrode.

3. The alkaline storage battery according to claim 1, wherein the metal capable of forming dendrite is at least one of Zn, Mg, Cd, Al, Ca, and Fe.

4. The alkaline storage battery according to claim 1, wherein a molar ratio of the functional group selected from the group consisting of the carboxyl group, the sulfone group and -CH(OH)-CH$_2$(OH) in the compound to a total of the hydroxyl group and the functional group selected from the group consisting of the carboxyl group, the sulfone group and -CH(OH)-CH2(OH) in the compound is 2.1% or more.

5. The alkaline storage battery according to claim 1, wherein 25 mol% or more of groups bonded to a carbon of a carbon main chain of the compound are the hydroxyl group and the functional group selected from the group consisting of the carboxyl group, the sulfone group and -CH(OH)-CH$_2$(OH).

6. The alkaline storage battery according to claim 4, wherein 25 mol% or more of groups bonded to a carbon of a carbon main chain of the compound are the hydroxyl group and the functional group selected from the group consisting of the carboxyl group, the sulfone group and -CH(OH)-CH$_2$(OH).

* * * * *

UNITED STATES PATENT AND TRADEMARK OFFICE
CERTIFICATE OF CORRECTION

PATENT NO. : 10,693,127 B2  
APPLICATION NO. : 15/214069  
DATED : June 23, 2020  
INVENTOR(S) : Tadashi Kakeya et al.

Page 1 of 1

It is certified that error appears in the above-identified patent and that said Letters Patent is hereby corrected as shown below:

In the Claims

Column 12, Line 62, Claim 1, after "dendrite", delete "and" and insert --or--.

Column 14, Line 6, Claim 3, after "Ca,", delete "and" and insert --or--.

Signed and Sealed this  
Eleventh Day of August, 2020

Andrei Iancu  
*Director of the United States Patent and Trademark Office*